(12) United States Patent
Joo et al.

(10) Patent No.: US 11,156,191 B2
(45) Date of Patent: Oct. 26, 2021

(54) INTERNAL COMBUSTION ENGINE WITH CROSS-BOOSTING TURBOCHARGERS

(71) Applicant: Southwest Research Institute, San Antonio, TX (US)

(72) Inventors: Shinhyuk Joo, San Antonio, TX (US); Christopher James Chadwell, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 14 days.

(21) Appl. No.: 16/691,661

(22) Filed: Nov. 22, 2019

(65) Prior Publication Data

US 2021/0156342 A1    May 27, 2021

(51) Int. Cl.
| | |
|---|---|
| *F02M 26/08* | (2016.01) |
| *F02M 26/43* | (2016.01) |
| *F02M 26/52* | (2016.01) |
| *F02B 9/02* | (2006.01) |
| *F02B 37/00* | (2006.01) |
| *F02D 41/00* | (2006.01) |
| *F02D 41/14* | (2006.01) |

(52) U.S. Cl.
CPC .............. *F02M 26/08* (2016.02); *F02B 9/02* (2013.01); *F02B 37/001* (2013.01); *F02D 41/0047* (2013.01); *F02D 41/0082* (2013.01); *F02D 41/1454* (2013.01); *F02M 26/43* (2016.02); *F02M 26/52* (2016.02)

(58) Field of Classification Search
CPC .......... F02M 26/08; F02M 26/52; F02B 9/02; F02B 37/001; F02B 37/013; F02D 41/0047; F02D 41/0082; F02D 41/1454

USPC ............................................ 60/605.2
See application file for complete search history.

(56) References Cited

U.S. PATENT DOCUMENTS

| | | | | |
|---|---|---|---|---|
| 2,780,053 A | * | 2/1957 | Cowland | F02B 37/013 60/612 |
| 6,158,218 A | * | 12/2000 | Herold | F02B 37/04 123/559.1 |
| 6,672,062 B2 | * | 1/2004 | Shaffer | F02B 37/013 60/612 |
| 7,165,403 B2 | * | 1/2007 | Sun | F02B 37/013 60/612 |
| 9,915,193 B2 | * | 3/2018 | Casal Kulzer | F02B 37/12 |
| 2003/0115876 A1 | | 6/2003 | Shaffer | |
| 2007/0251234 A1 | | 11/2007 | Liu et al. | |

(Continued)

FOREIGN PATENT DOCUMENTS

| | | |
|---|---|---|
| DE | 10 2016 204142 A1 | 9/2017 |
| FR | 2 444 798 A1 | 7/1980 |

(Continued)

*Primary Examiner* — Thai Ba Trieu
(74) *Attorney, Agent, or Firm* — Livingston Law Firm

(57) ABSTRACT

An internal combustion engine having two "banks" of cylinders, the "banks" being defined by cross-connection to different turbochargers. The exhaust from one bank of cylinders goes to a first turbocharger, and the exhaust from the other bank of cylinders goes to a second turbocharger. However, the compressed air delivered from the turbochargers is cross-connected to the cylinder banks. This allows a cylinder bank to be boosted with a turbocharger whose compressed air output does not necessarily match the exhaust energy of that cylinder bank.

16 Claims, 3 Drawing Sheets

(56) References Cited

U.S. PATENT DOCUMENTS

| | | | | |
|---|---|---|---|---|
| 2014/0366529 A1* | 12/2014 | Komatsu | ............... | F02M 26/08 |
| | | | | 60/600 |
| 2016/0010539 A1* | 1/2016 | Verdoorn | ........... | F02D 13/0242 |
| | | | | 60/600 |
| 2018/0023458 A1* | 1/2018 | Hotta | ................... | F02B 37/001 |
| | | | | 60/612 |
| 2019/0390594 A1* | 12/2019 | Kamiya | ................. | F02B 37/24 |

FOREIGN PATENT DOCUMENTS

| | | | | | |
|---|---|---|---|---|---|
| FR | 2904365 | A1 | * | 2/2008 | ............ F02B 37/013 |
| JP | 58077123 | A | * | 5/1983 | ............ F02B 37/007 |
| JP | 2005054771 | A | * | 3/2005 | ............. F02M 26/08 |
| JP | 2010209845 | A | * | 9/2010 | |
| WO | WO-2018169480 | A1 | * | 9/2018 | ......... F02D 41/0082 |

\* cited by examiner

INTERNAL COMBUSTION ENGINE WITH CROSS-BOOSTING TURBOCHARGERS

TECHNICAL FIELD OF THE INVENTION

This invention relates to internal combustion engines, and more particularly to turbochargers for such engines.

BACKGROUND OF THE INVENTION

A turbocharger is a turbine-driven forced induction device that increases an internal combustion engine's efficiency and power output by forcing extra compressed air into the combustion chamber. The turbocharger comprises a turbine and a compressor. Engine exhaust drives the turbine, which in turn drives the compressor.

A turbocharged engine's improved power output is due to the fact that the compressor can force more air—and proportionately more fuel—into the combustion chamber than atmospheric pressure alone. As an alternative to increasing power output for a given engine, turbocharging can increase fuel efficiency by allowing an engine with smaller displacement.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to the recognition that in conventional turbocharged engines, a turbocharger's boosting performance is directly related to the engine's combustion. This relationship does not allow for engine strategies in which the requirements of the engine do not match the available output of the turbocharger. At conditions in which exhaust temperatures are low and hence turbine output is low, an engine might require high boost. Conversely, at conditions in which there is plenty of exhaust energy, an engine may require only a moderate level of boosting. This mismatch between engine demands and boosting power availability limits the possible operation range of advanced combustion strategies.

Figure 1:
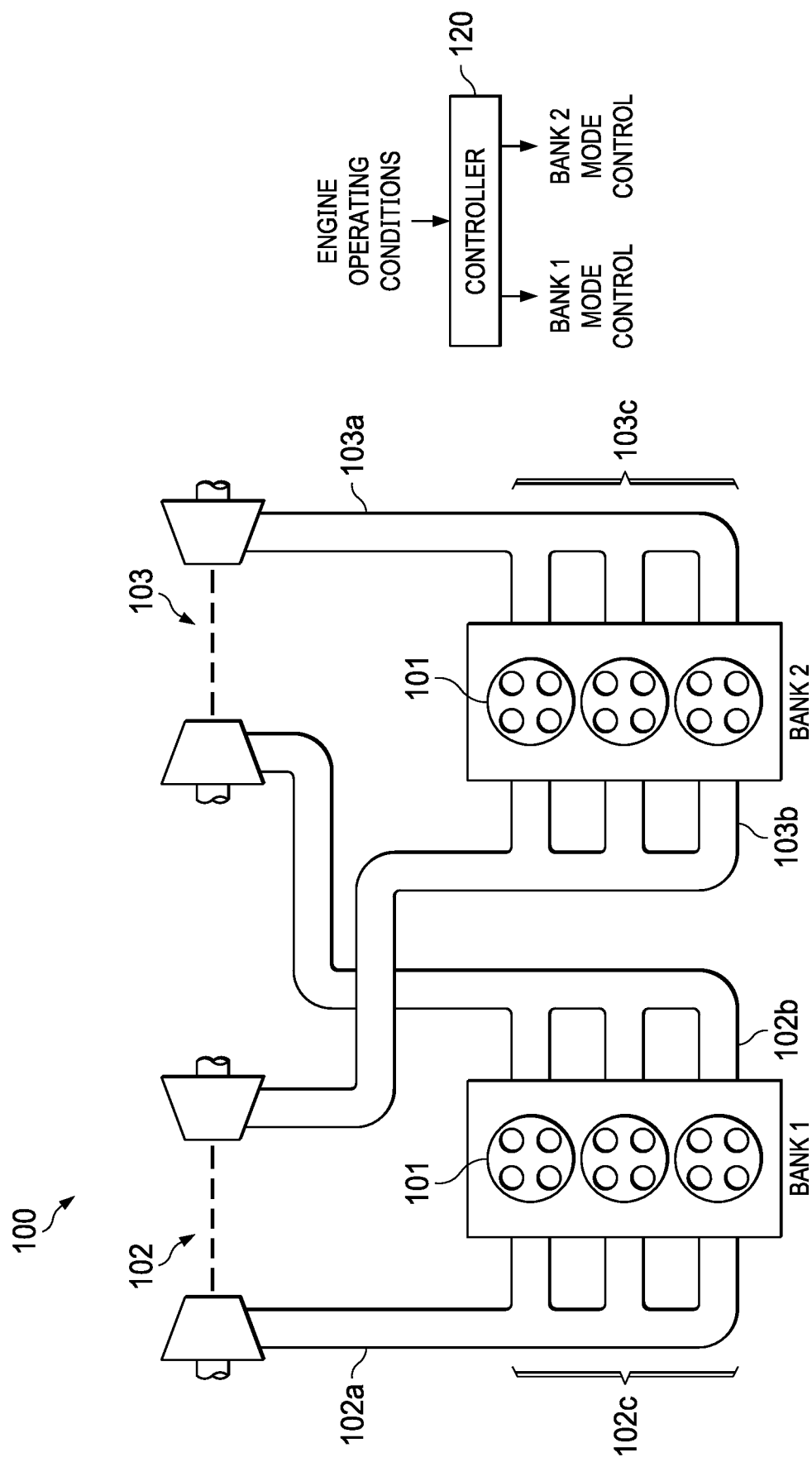
FIG. 1 illustrates an internal combustion engine having two cylinder banks with cross-boosting in accordance with the invention.

FIG. 1 illustrates an internal combustion engine 100 having six cylinders 101. Engine 100 is represented schematically by its cylinders 101; it is assumed that engine 100 has all other elements for operating as an internal combustion engine. The type of fuel used for engine 100 may be any one of a number of available fuels, and it is particularly assumed that each cylinder 101 has fueling control to control the type and amount of fuel delivered to it, as well as ignition and charge compression equipment if appropriate for any of the engine operating modes described below.

In the example of this description, engine 100 is a six-cylinder engine. However, the concepts described herein apply to internal combustion engines having any number of cylinders.

Engine 100 is equipped with two turbochargers 102 and 103, each having its own turbine and compressor. It is not necessary that the turbochargers have the same specifications in terms of boosting ability or be the same type of turbocharger.

In the example of FIG. 1, each turbocharger 102 and 103 serves one-half the engine's cylinders. Thus, for engine 100 having six cylinders, each turbocharger serves a "bank" of three cylinders. This results in two cylinder banks, identified as Bank 1 and Bank 2.

The exhaust lines of Bank 1 are connected as input to the turbine of turbocharger 102. The exhaust lines of Bank 2 are connected as input to the turbine of turbocharger 103. The connection lines are identified as exhaust connection lines 102a and 103a, respectively.

The output of the compressor of turbocharger 102 is connected to the air intake of Bank 2. The output of the compressor of turbocharger 103 is connected to the air intake of Bank 1. The connection lines are identified as air boost connection lines 102b and 103b, respectively.

Although not explicitly shown, cylinders 101 each have exhaust ports for delivering exhaust gas to lines 102a and 103a, as well as intake ports for receiving compressed air via lines 102b and 103b.

The intake and exhaust manifolds to the cylinder banks are "split" so that each cylinder bank may be connected to a desired number of intake ports and exhaust ports. In FIG. 1, where each bank of cylinders has three intake ports and three exhaust ports, shared manifolds are identified as manifolds 102c and 103c.

In other embodiments, the cylinder banks need not have the same number of cylinders. For example, an eight-cylinder engine could have one bank with three cylinders and another bank with five cylinders. It is expected that the typical application of the invention will be implemented with two cylinder banks, but more are possible.

In operation, exhaust gas from Bank 2 drives the turbine of turbocharger 103. Because of the cross connected air boost connection lines 102b and 103b, the compressed air from turbocharger 103 is delivered to Bank 1.

Similarly, exhaust gas from Bank 1 drives the turbine of turbocharger 102. The compressed air from turbocharger 102 is delivered to Bank 2.

The cross-boosting operation of turbochargers 102 and 103 allows combustion to be separated from boosting. In other words, Bank 1 can be operated in a different combustion mode than Bank 2 and use a different boosting level.

Examples of various internal combustion modes are rich, lean, or stoichiometric combustion, which having varying equivalence ratios. Another group of combustion modes includes CCI (charge compression ignition) modes, in which fuel and oxidizer (typically air) are compressed to the point of auto-ignition. These CCI modes include HCCI (homogenous charge compression ignition) and PCCI (premixed charge compression ignition) combustion modes.

Thus, for example, Bank 1 could be operated at one equivalence ratio (rich, lean, or stoichiometric) and Bank 2 could be operated at another. Bank 1 operating at stoichiometric equivalence ratio only requires a moderate level of boosting from turbocharger 103 but provides a generous level of exhaust gas for turbocharger 102 for boosting Bank 2.

As another example, Bank 1 could be operated in a CCI mode. A highly diluted CCI mode requires a high level of boost, but the exhaust output is low temperature. However, the required boost for Bank 1 could be made available from its associated turbocharger 103 operating at a mode that produces a high level of exhaust energy. Thus, at the same time, Bank 2 could be operated at a mode, such as stoichiometric, that does not require a high level of boosting from its associated turbocharger 102 but does produce high energy exhaust for turbocharger 103.

Figure 2:
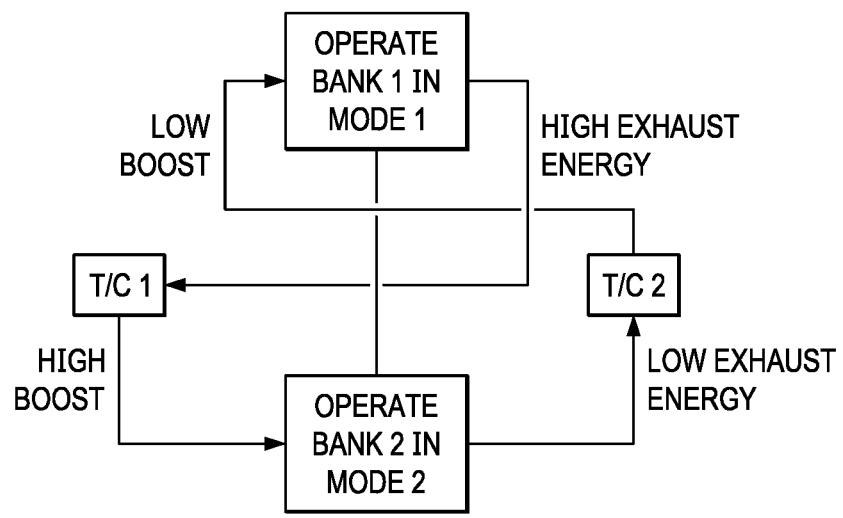
FIG. 2 illustrates a method of operating a cross-boosted internal combustion engine, such as the engine of FIG. 1.

FIG. 2 illustrates a method of operating an engine having cross-boosting in accordance with the invention. The engine is configured as described above, with cross-connected turbochargers. The result is two banks of cylinders, each having an associated turbocharger.

A first bank of cylinders is operated in a first mode, that requires only low boost. It delivers high energy exhaust to an associated turbocharger. The other bank of cylinders is operated in a second mode that requires high boost. It delivers low energy exhaust to an associated turbocharger.

The turbochargers do not deliver compressed air to the same cylinder bank that drives their turbines. Instead, their compressed air outputs are cross-connected so that compressed air is delivered to the other cylinder bank.

The terms "low" and "high" are used in a relative sense. A "low" boost that is optimal for one mode is lower than the boost optimal for the other mode. Similarly, the "high" energy exhaust output from one mode is exhaust that is hotter and will drive the turbine to more power than the exhaust output of the other mode.

In sum, features of the invention are that "banks" of cylinders are defined by being cross-connected to different turbochargers, and may operate in different modes with different air boost requirements. Each bank of cylinders is boosted with a different turbocharger. It could be the case that the banks of cylinders are operated in modes that have different air boost requirements, but not necessarily different exhaust energy outputs.

The different engine operating modes need not be operated continuously. In other words, a cylinder bank might run in a mode that is a "part-time mode", occurring only during certain engine conditions. For example, upon engine startup, one cylinder bank might be run in a rich mode and the other cylinder bank be run in stoichiometric mode. In other operating conditions, both cylinder banks might operate in stoichiometric mode.

Figure 3:
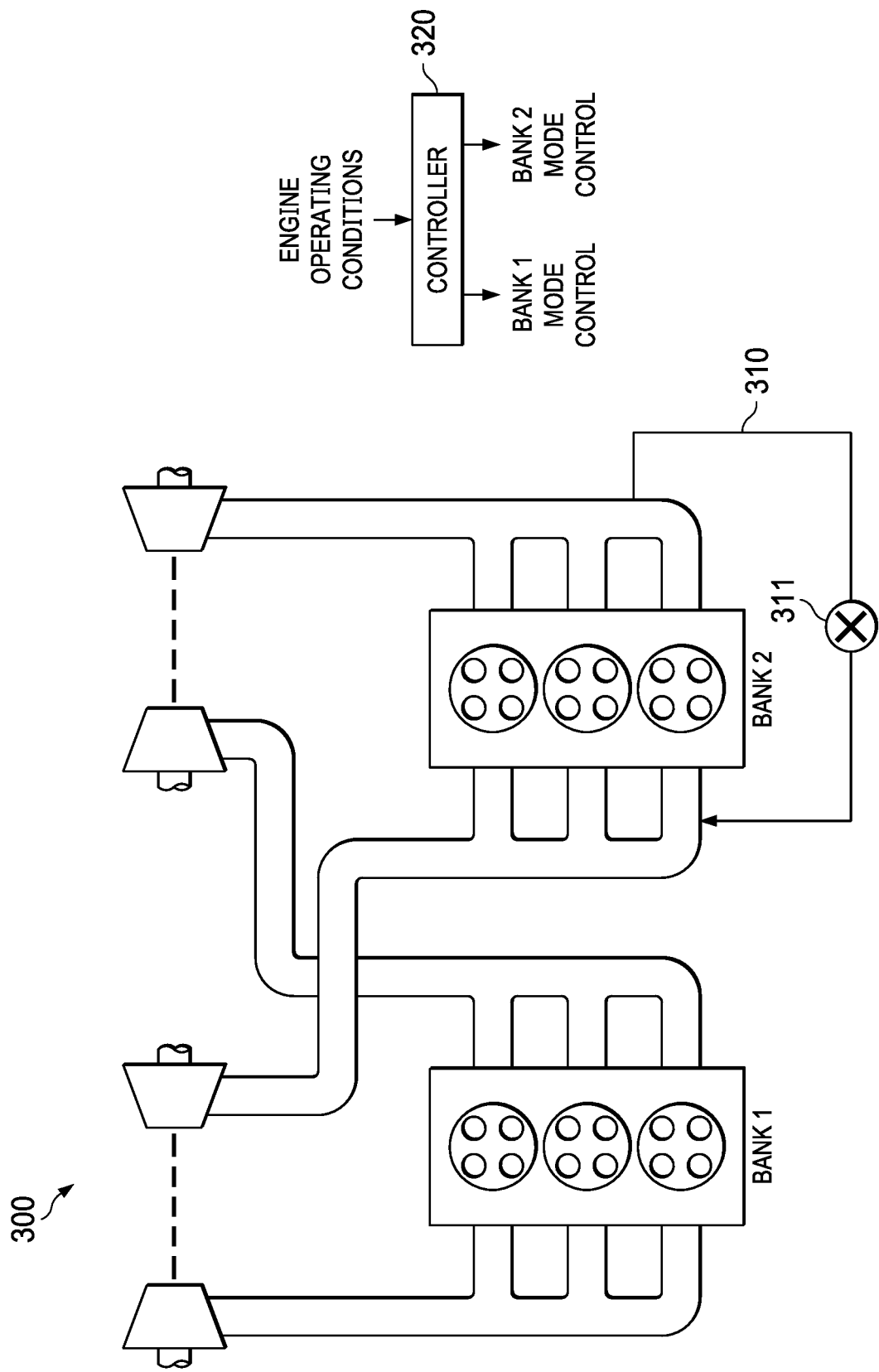
FIG. 3 illustrates an engine similar to that of FIG. 1, but in which one of the cylinder banks has an exhaust gas recirculation (EGR) loop.

FIG. 3 illustrates an embodiment of the invention in which at least one bank of cylinders has an exhaust gas recirculation (EGR) loop. In the example of FIG. 3, one cylinder bank, Bank 2, has an EGR loop 310.

Exhaust gas is recirculated from the cylinders of Bank 2 back to the intake of those cylinders. An EGR valve 311 is used to control when Bank 2 operates in EGR mode and how much EGR is provided.

When valve 311 is open and Bank 2 is operating in EGR mode, Bank 2 has reduced exhaust temperature (energy) for boosting. However, the operation of Bank 2 in EGR mode is optimal with a higher level of boosting so that fresh air and EGR is adequately pushed into the intake. Thus, during the EGR mode of Bank 2, Bank 1 is operated at a mode that provides a sufficient level of boosting for Bank 2. During the EGR mode of Bank 2, one appropriate mode for Bank 1 is a stoichiometric mode.

Referring again to FIGS. 1 and 3, both engines 100 and 300 are equipped with a controller 120 and 320, respectively, which delivers "mode control" signals to Bank 1 and Bank 2. The method of FIG. 2—operating cylinders in different modes with cross-boosted turbochargers—is implemented with this controller.

Controller 120 or 320 has appropriate hardware and programming to carry out these tasks. It may be part of a larger and more sophisticated engine control unit.

The mode control signals cause each cylinder bank to operate in a selected mode, based on input representing engine operating conditions. These mode control signals may vary depending on the particular mode selected. They may include for example, fueling signals. In the case of EGR mode, the mode control signals would control EGR valve 311.

What is claimed is:

1. An improved internal combustion engine, the engine having a number of cylinders, and the improvements comprising:
    a first turbocharger;
    a second turbocharger;
    wherein the first turbocharger receives all exhaust output from a first bank of cylinders;
    wherein the second turbocharger receives all exhaust output from a second bank of cylinders;
    wherein all compressed air output of the first turbocharger is connected to an air intake of the second bank of cylinders;
    wherein all compressed air output of the second turbocharger is connected to an air intake of the first bank of cylinders;
    an engine mode control unit operable to operate the first bank of cylinders in a first operating mode; to operate the second bank of cylinders in a second operating mode; and
    wherein an air boost used for the first mode is different than an air boost used for the second mode.

2. The system of claim 1, wherein the first or second operating modes is a mode in the group of: rich, stoichiometric, or lean.

3. The system of claim 1, wherein the first or second operating mode is a charge compression ignition mode.

4. The system of claim 1, wherein the banks of cylinders have equal numbers of cylinders.

5. The system of claim 1, wherein the first or second operating mode is a part-time operating mode.

6. The system of claim 1, wherein the first turbocharger and the second turbocharger are different types of turbochargers.

7. The system of claim 1, wherein the first turbocharger and the second turbocharger have different boosting capabilities.

8. An improved internal combustion engine, the engine having a umber of cylinders; and the improvements comprising:
    a first turbocharger;
    a second turbocharger;
    wherein the first turbocharger receives all exhaust output from a first bank of cylinder;
    wherein the second turbocharger receives all exhaust output from a second bank of cylinders;
    wherein all compressed air output of the first turbocharger is connected to an air intake of the second bank of cylinders;
    wherein all compressed air output of the second turbocharger is connected to an air intake of the first bank of cylinders;
    an exhaust gas recirculation loop on either or both the first bank or cylinders or the second bank of cylinders;

an engine mode control unit operable to operate the first bank of cylinders in a first operating mode; to operate the second bank of cylinders in a second operating mode; and wherein the first operating mode or the second operating mode is an exhaust gas recirculation mode that provides an air boost different than an air boost used for the other mode.

9. A method of operating an internal combustion engine, the engine having a number of cylinders, each cylinder having exhaust output and air intake, comprising:

connecting the exhaust output from a first bank of one of more of the cylinders to a first turbocharger having a first compressed air output;

connecting the exhaust output from a second bank of the remaining cylinders to a second turbocharger having a second compressed air output;

connecting the first compressed air output of the first turbocharger to the air intake of the second bank of cylinders;

connecting the second compressed air output of the second turbocharger to the air intake of the first bank of cylinders;

operating the first bank of cylinders in a first operating mode;

operating the second bank of cylinders in a second operating mode;

wherein the first operating mode and the second operating mode have different air boost requirements such that the first compressed air output is greater than the second compressed air output; and using a controller to generate mode control signals to the first bank and second bank, the mode control signals operable to cause the first bank and second bank to operate in different operating modes with the different air boost requirements.

10. The method of claim 9, wherein the step of operating the first bank of cylinders in a first operating mode and/or the step of operating the second bank of cylinders in a second operating mode are performed by operating the first mode or the second mode as a mode in the group of: rich, stoichiometric, or lean.

11. The method of claim 9, wherein the step of operating the first bank of cylinders in a first operating mode or the step of operating the second bank of cylinders in a second operating mode is performed by operating the first mode or the second mode as a charge compression ignition mode.

12. The method of claim 9, wherein the connecting steps are performed such that the banks of cylinders have equal numbers of cylinders.

13. The method of claim 9, the step of operating the first bank of cylinders in a first operating mode or the step of operating the second bank of cylinders in a second operating mode is performed by operating the first mode or the second mode as a part-time operating mode.

14. The method of claim 9, wherein the connecting steps are performed such that the first turbocharger and the second turbocharger are different types of turbochargers.

15. The method of claim 9, wherein the connecting steps are performed such that the first turbocharger and the second turbocharger have different boosting capabilities.

16. A method of operating an internal combustion engine, the engine having a number of cylinders, each cylinder having exhaust output and air intake, comprising:

connecting the exhaust output from a first bank of one of more of the cylinders to a first turbocharger having a first compressed air output;

connecting the exhaust output from a second bank of the remaining cylinders to a second turbocharger having a second compressed air output;

providing an exhaust gas recirculation loop on either or both of the first bank of cylinders or the second bank of cylinders;

connecting the first compressed air output of the first turbocharger to the air intake of the second bank of cylinders;

connecting the second compressed air output of the second turbocharger to the air intake of the first bank of cylinders;

operating the first bank of cylinders in a first operating mode;

operating the second bank of cylinders in a second operating mode;

wherein the first operating mode or the second operating mode is an exhaust gas recirculation mode that provides an air boost different than an air boost used for the other mode.

* * * * *